April 29, 1958   C. J. PIERCE, JR., ET AL   2,832,270
FOLDING BOX ASSEMBLY MACHINES Filed Feb. 11, 1955   7 Sheets-Sheet 1

INVENTOR.
Chester J. Pierce Jr.
BY  & Thomas F. Burke
Howard G. Russell
their  ATTORNEY April 29, 1958 C. J. PIERCE, JR., ET AL 2,832,270
FOLDING BOX ASSEMBLY MACHINES
Filed Feb. 11, 1955 7 Sheets-Sheet 2

INVENTOR.
Chester J. Pierce Jr.
BY & Thomas F. Burke

Howard G Russell
their ATTORNEY

April 29, 1958   C. J. PIERCE, JR., ET AL   2,832,270
FOLDING BOX ASSEMBLY MACHINES Filed Feb. 11, 1955   7 Sheets-Sheet 3

INVENTOR.
Chester J. Pierce Jr.
BY  & Thomas F. Burke

Howard G. Russell
their ATTORNEY

April 29, 1958  C. J. PIERCE, JR., ET AL  2,832,270
FOLDING BOX ASSEMBLY MACHINES Filed Feb. 11, 1955  7 Sheets-Sheet 4

INVENTOR.
Chester J. Pierce Jr.
BY & Thomas F. Burke
Howard G. Russell
their ATTORNEY

Fig. 10

April 29, 1958 C. J. PIERCE, JR., ET AL 2,832,270
FOLDING BOX ASSEMBLY MACHINES
Filed Feb. 11, 1955 7 Sheets-Sheet 6

INVENTOR.
Chester J. Pierce Jr.
BY & Thomas F. Burke
Howard G. Russell
their ATTORNEY April 29, 1958   C. J. PIERCE, JR., ET AL   2,832,270
FOLDING BOX ASSEMBLY MACHINES
Filed Feb. 11, 1955   7 Sheets-Sheet 7

INVENTOR.
Chester J. Pierce Jr.
BY  & Thomas F. Burke
Howard C. Russell
their  ATTORNEY

United States Patent Office 2,832,270
Patented Apr. 29, 1958

2,832,270

FOLDING BOX ASSEMBLY MACHINES

Chester J. Pierce, Jr., Palo Alto, and Thomas F. Burke, Redwood City, Calif., assignors, by mesne assignments, to Baljak Corporation, Wilmington, Del., a corporation of Delaware Application February 11, 1955, Serial No. 487,632

10 Claims. (Cl. 93—51)

This invention relates to improvements in folding box assembly machines of the type in which a flat, or nearly flat blank of foldable sheet material, for example paperboard, is forced through a folding die by a plunger, whereby the blank is folded into hollow box form.

The invention has particular application to devices of the aforementioned general class which, in addition to folding the blank during its passage through the die, also perform locking operations on the box blank to lock certain blank portions, such as walls, panels, tabs or flaps together, so that the blank portions thereafter remain interlocked in box forming position without extraneous connecting means, such as adhesive, staples, rivets, or the like.

Devices embodying the present invention are particularly well suited for the assembly of lined blanks into box form to produce an outer box shell with an inner box liner which is largely loose and attached to the shell only by glue spots and so arranged that it will hold a volume of liquid without leaking. This is required, for example, in the packaging of frozen fruits and vegetables.

Lined box blanks present problems which are not generally encountered in the assembly of unlined blanks, in that the box forming mechanism must be so constructed and arranged that it will not damage the liner. This requirement precludes the use of such commonly employed means as hook shaped projections on the plunger, for example, which project through or from apertures in the blank, grasp other portions of the blank which are then pulled towards the inside of the box for the purpose of forming the interlock. It is evident that such mechanism would puncture or tear the liner and destroy the liquid tightness of the box.

The invention provides among other features and advantages a box forming mechanism which produces a tightly locked rigid box corner in which there is no looseness or play between the interlocking portions of the box shell and which handles the box liner and the box shell in such a way that the liner is not injured and that the liner does not interfere with the locking operation.

In this connection the invention provides a method of interlocking the corner forming portions of a lined box blank in such a way as to obtain rigidity and strength as well as freedom from looseness and play in the box shell and liquid tightness in the box liner, the liner being automatically folded and shaped simultaneously with the box shell.

These and other objects, features and advantages of the invention will appear more fully from the detailed description which follows, accompanied by drawings showing, for the purpose of illustration, a preferred embodiment of the invention.

The invention also consists in certain new and original features of construction and combination of elements, as well as steps and sequences of steps hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which

In the following description and in the claims various structural details will be identified by specific names for convenience. These names, however, are intended to be generic in their application. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects without departure from the principles of the invention, and that the invention may be applied to other structures than those shown.

The construction and operation of the box forming mechanism, and the steps involved in the assembly of the lined box will be more readily understood by first considering briefly the details of a typical lined box blank which may be handled by the assembly mechanism.

The box blank A comprises a shell portion $A_1$ of paperboard or other suitable foldable sheet material and a liner portion $A_2$.

Figure 1:
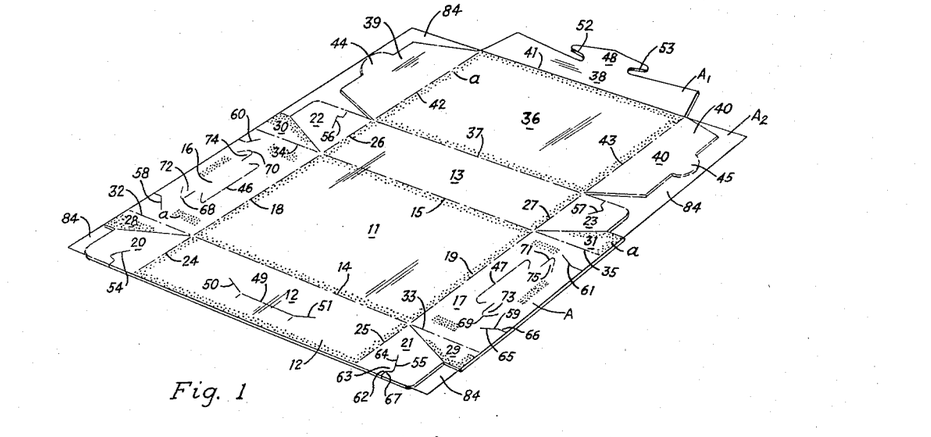
Fig. 1 is a perspective view of a typical flat lined box blank which may be assembled into hollow box form in accordance with the invention, the liner facing the observer.

The blank $A_1$ is traversed by several scored fold lines to provide a main or bottom panel 11 to which a front panel 12 and a back panel 13 are articulated along a front fold line 14, and a back fold line 15, respectively. Side panels 16 and 17 are articulated to the bottom panel 11 along side fold lines 18 and 19, respectively.

Lock flaps 20, 21, 22 and 23 are articulated to the front and back panels along corner fold lines 24, 25, 26, and 27, respectively. These corner fold lines are either aligned with, or slightly offset with respect to, the side fold line 18 and 19 to compensate for the thickness of the board and of the liner in a conventional manner. Corner flaps 28, 29, 30 and 31 may be articulated to the side panels 16 and 17 along corner flap fold lines 32, 33, 34 and 35, respectively.

A top panel 36 is articulated to the back panel 13 along a cover fold line 37. A front tuck flap 38 and side tuck flaps 39 and 40 are articulated to the top panel 36 along tuck flap fold lines 41, 42 and 43, respectively.

The tuck flaps comprise tab projections 44 and 45 fitting into cuts 46 and 47 in the side panels 16 and 17, respectively. Similarly, the front tuck flap 38 has a locking tab 48 fitting into a cut 49 in the front panel 12 and engages edge portions 50 and 51 of the cut with correspondingly oriented edge portions 52 and 53 of the tab 48.

The corner locks of the shell blank comprise external cuts in the side wall panels and in the associated lock flaps. These cuts are moved into interlocking engagement after erection of the front, back and side panels of the box into upright position in regard to the bottom panel.

The construction of all four box corners is identical. It will therefore be sufficient to describe one of the four external cuts 54, 55, 56 and 57 in the lock flaps 20, 21, 22 and 23, which are brought into engagement with other external cuts 58, 59, 60 and 61 in the side panels 16 and 17, respectively.

The external cut 55 is preferably of bent outline and comprises an exterior portion 62, an intermediate portion 63 extending at an angle to exterior portion 62, and an interior portion 64 extending at an angle to the intermediate portion 63. The interior portion 64 runs preferably in a substantially radial direction towards the box corner marked by the intersection of the fold lines 14 and 19.

Figure 4:
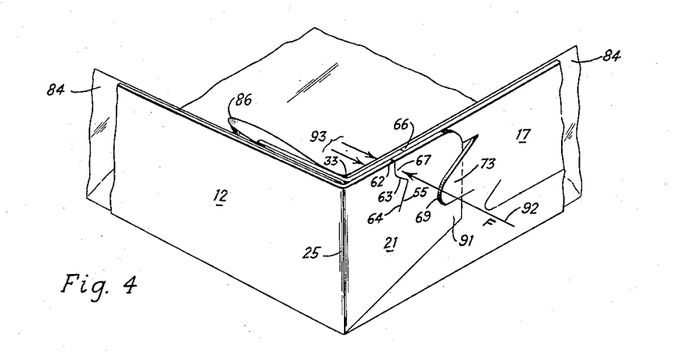
Fig. 4 is a perspective view, on an enlarged scale, of a folded box corner prior to completion of the lock.

The corresponding external cut 59 in the side panel 17 comprises an interior portion 65 and an exterior portion 66. When the panels and flaps are in corner-forming position, as is also shown in Figure 4, the interior portion 65 of the cut 59 registers with the interior portion 64 of the cut 55. This permits edges of the two cuts to be brought into edge-to-edge engagement by the blank locking mechanism, as will later be described. As is best seen in Figure 4, the exterior portions of the two cuts do not register, but are offset. The amount of the offset is roughly equal to the extent of the intermediate portion 63 of cut 55.

The offset is selected in accordance with the flexibility of the board. In the type of board more commonly used for frozen food packages, the offset may be of the order of $3/32$ of an inch, or roughly 2½ mm.

Figure 5:
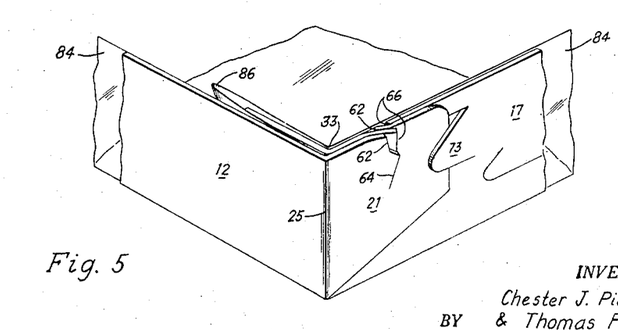
Fig. 5 is a perspective view of the box corner of Fig. 4 after completion of the lock.

For the purpose of locking, the corner assembly is flexed adjacent to the external portions 62 and 66 into the position shown in Figure 5. This will be described in greater detail further below. At this point it will suffice to say that the amount of offset should be such that the engagement shown in Figure 5 can be formed without permanently creasing the board at the base of the tongue or projection 67 formed by the angularly disposed cuts 62 and 63.

Internal cuts 68, 69, 70 and 71 of bent outline form internal tongues 72, 73, 74 and 75 in the side panels 16 and 17. The internal tongues are directed toward the respective box corners and serve to anchor the lock flaps in flat side panel overlying position when the box is set up. This will become apparent as the description proceeds.

The liner $A_2$ is preferably a sheet 84 of liquid impermeable liner material, for example, cellulose acetate, adhesively secured to the box shell blank $A_1$ along glue areas marked $a$ in Figure 1.

The glue areas are so selected that the liner follows the folding motion of certain panels and flaps to which it is attached, and does not follow other flaps or blank portions to which it is not attached. The liner is substantially rectangular in outline and corresponds roughly to the size of the box blank $A_1$, not including the front tuck flap 38.

Figure 2:
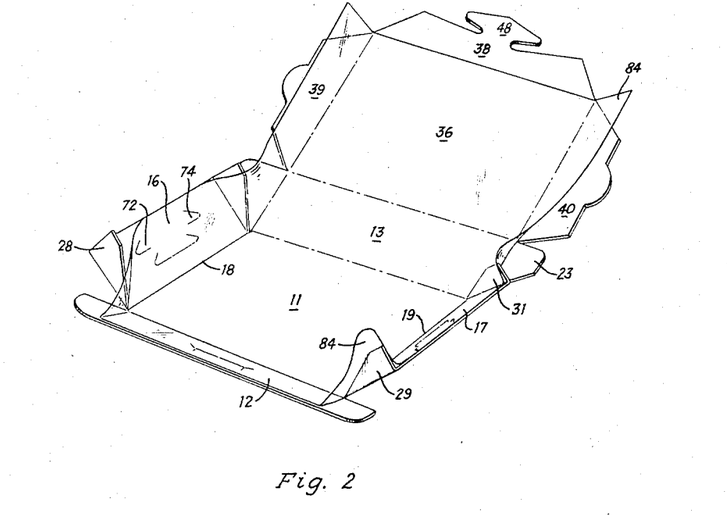
Figs. 2 and 3 are perspective views of the box blank of Fig. 1 at successive stages of assembly.

The blank $A_1$ together with its liner 84 is converted into hollow box form by a series of operations substantially as follows:

The side panels 16 and 17 are first folded towards upright position with respect to the bottom panel 11 along the side fold lines 18 and 19. Substantially simultaneously the corner flaps 28, 29, 30 and 31 are folded into substantially right angular position with respect to the side panels in which they are articulated. This operation prepares the corner portion of the liner $A_2$ for folding into gusset form. The partially folded blank is shown in Figure 2.

Figure 3:
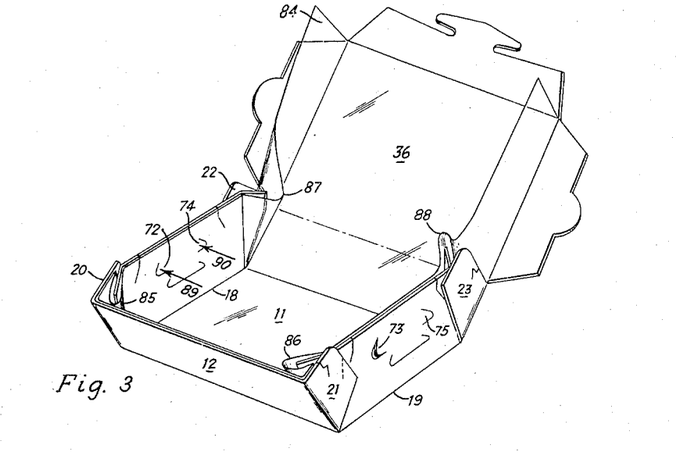

Figure 3 illustrates the blank at a further advanced stage of assembly. The side panels 16 and 17 are in substantially upright position and the front panel 12 and the back panel 13 are folded about their respective fold lines 14 and 15 into substantially upright position. Substantially simultaneously the lock flaps 20, 21, 22 and 23 are folded along their fold lines 24, 25, 26 and 27 to assume an angular position with respect to the front panel 12 and the back panel 13.

The corner flaps 28, 29, 30 and 31 control the folding of the liner at the corners. Since the liner is adhesively secured to the corner flaps, the liner arranges itself in gusset folds 85, 86, 87 and 88 about the corner flaps. Figure 3 illustrates the position of the corner-forming flaps and panels at a point where the front panel 12 and the back panel 13 have moved approximately 45 degrees.

The lock flaps 20, 21, 22 and 23 are now guided under the internal tongues 72, 73, 74 and 75. For this purpose pressure is exerted on these tongues from the inside. The deflection of the board at the point of application of the force as indicated by arrows 89 and 90, is slight, but opens the internal cuts sufficiently for the lock flaps 20, 21, 22 and 23 to slide underneath. The tongue 73 maintains the flap 21 in a position overlying the side panel 17.

In the condition illustrated in Figure 4, the box corners are ready for interlocking of the locking cuts. This is done as follows:

A force F is exerted in the direction and at the point indicated by the arrow 92 at the tongue or projection 67 formed by the offset of the cut 55. At the same time the side panel 17 is supported on the inside along an area 93 between the corner 25 proper and the end of the cut 62. This causes the tongue 67 to snap in back of the portion of the side panel which lies between the cut 66 and the fold line 33. The completed lock is shown in Figure 5. The lock proper is formed by the interior portion 64 of the cut in the flap 21 and the interior portion 65 of the cut 59 in the side panel. This cut registers with the cut portion 64, but is not visible in Figure 5. However, it was previously explained that the two locking cuts, namely the cut 59 in the side panel and cut 55 in the lock flap are so laid out that the lower portions register when the corner is square, so that, by flexing of the board, edges of the registering cuts can be brought into edge-to-edge engagement. This engagement locks the corner against forces directed from the inside of the box outwardly.

The exterior portion of the cuts, namely the portion 62 of the cut 55 and the portion 66 of the cut 59, perform the function of a safety catch which keeps the edges of the lower portions of the cuts in engagement.

The box corner is resistant to forces acting from the outside towards the inside by reason of the edge-to-panel engagement between the side panel 17 and the front panel 12. More particularly, the side edge of the panel 17 represented by the fold line 33 rests against the interior panel surface of the front panel 12 adjacent the corner foldline 25.

This mechanical tightness of the box corner against inwardly directed pressure is important for the packaging of frozen foods, since the filled enclosed cartons are tightly overwrapped. Tight overwrapping naturally tends to push the front and back panels 12 and 13 towards the inside of the box. The illustrated corner construction prevents this from happening.

In addition to being mechanically tight, the carton is fluid tight because of the formation of gussets at all four box corners, the gusset 86 being visible in Figures 4 and 5.

Figure 6:
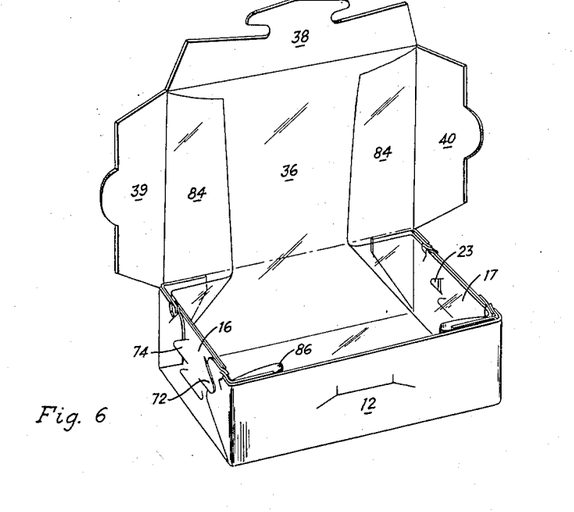
Fig. 6 is a perspective view of the erected box ready for filling.
Figure 7:
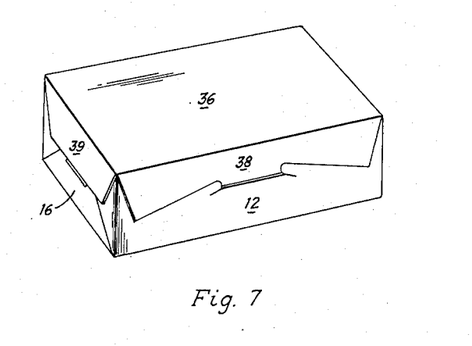
Fig. 7 is a perspective view of the filled and closed box.

The locked carton is shown in Figure 6. It is ready for filling with merchandise and may then be closed in conventional manner by equally conventional closing machines. Figure 7 shows the closed carton in condition for overwrapping.

From the hereinbefore described locking procedure, and more particularly from Figures 6 and 7, it is seen that the application of forces for locking the box corners does not interfere with, nor damage, the liner 84.

Figure 8:
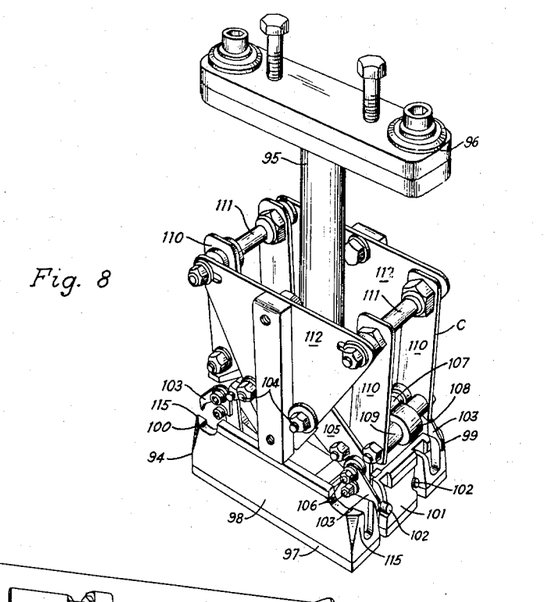
Fig. 8 is a perspective view of a box blank folding plunger incorporating the invention.
Figure 9:
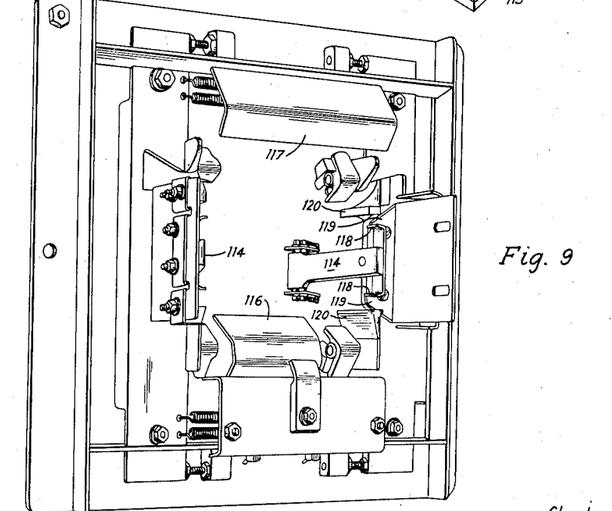
Fig. 9 is a perspective view of a folding die fitting the plunger of Fig. 8.

The device for automatically performing the various folding and locking operations comprises, basically, a plunger C shown in Figure 8 and a die D shown in Figure 9.

The plunger C comprises a plunger body 94 secured to the lower end of a stem or post 95 provided at its upper end with a mounting plate 96 for attachment to the reciprocating ram of a box assembly machine of the general type shown in United States Patent 2,655,843 to Baker and Lefief. The plunger body 94 has a base plate 97 of substantially the size of the bottom panel 11 of the blank to be handled by the device. The base plate 97 may be replaced by a thicker plate if a box of greater depth is to be set up or by a thinner plate if a shallower box is to be handled. The plunger body is essentially of box shape and has front and back surfaces 98 and 99 as well as side surfaces 100 and 101 against which the front and back panels and the side panels of the blank are foldable.

The side surfaces 100 and 101 are provided with fixed projections 102 against which the internal tongues 73 and 75 of the blank come to rest when the side panels of the blank are folded against the side surfaces of the plunger. In order to open the internal cuts 69 and 71 in the hereinbefore described manner, the projections 102 protrude beyond the portion of the side surface 101 lying therebetween. The die D comprises a cam rail 114 which urges the central portion of the side panel 17 of the blank towards the side surface of the plunger far enough to cause the cuts 69 and 71 to open.

The plunger is further provided with a pair of movable fingers 103 at both side surfaces 100 and 101. These fingers are pivotally movable about a pivotal axis 104 so arranged that the fingers move on an arc inwardly and downwardly towards the base plate 97 when being retracted.

The mechanism supporting the movable fingers comprises levers 105 pivotally mounted at 104. The fingers proper 103 are secured to the lower ends of the levers by nuts 106 in such a way as to permit slight adjustment of the fingers. A connecting bar 107 extends between each pair of levers 105 intermediate the ends of the levers. An actuating roller 108 normally bears against the connecting bar 107. The roller 108 is mounted on a rod 109 suspended by arms 110 pivotally mounted on transverse rods 111 extending between side plates 112 of the plunger.

Figure 11:
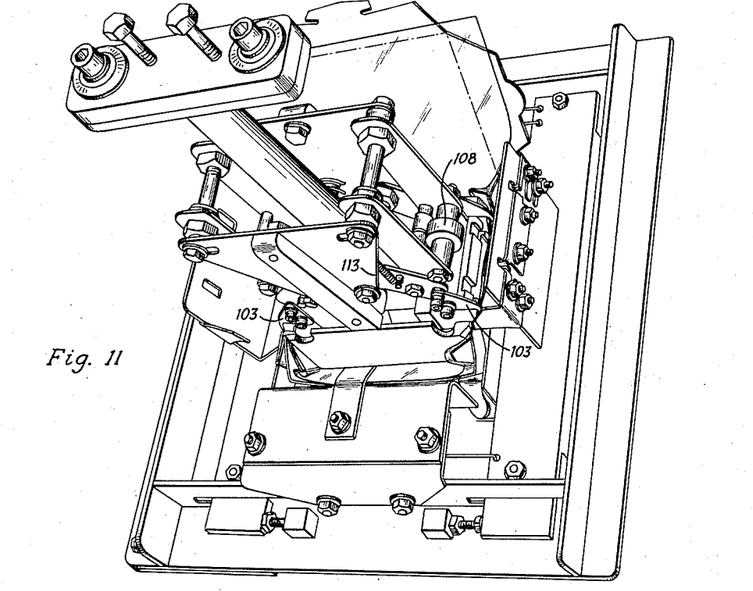
Fig. 11 is a perspective view of the plunger and die, as well as box blank, at an advanced stage of the assembly.

Springs not visible in Figure 8 but visible at 113 in Figure 11 normally bias the fingers 103 towards their fully projected position. When the plunger moves through the die the roller 108 is engaged by the cam rail 114, moves inwardly and causes the finger to be retracted.

Figure 12:
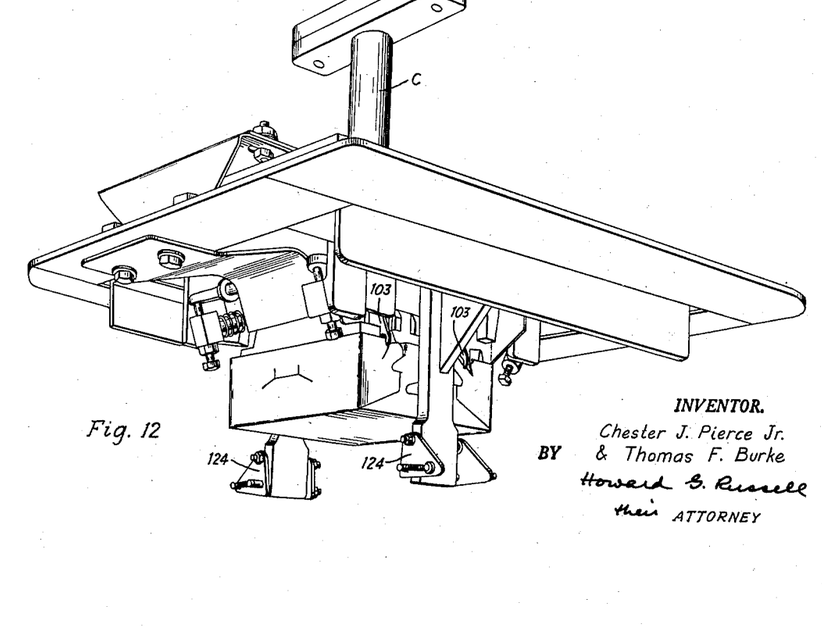
Fig. 12 is a perspective view showing the under-side of the die at a point where the locking operation is being performed.

The precise location of the fingers with regard to the box blank is of importance. When the fingers are fully projected, they lie above the top edges of the side panels of the box blank, considering the side panels in an upright position. The tips of the fingers are at such a height above the base plate of the plunger that the top edge of the side panels clear the fingers by a narrow margin. When the fingers are subsequently retracted, their inward and downward swing causes the tips of the fingers to engage the side panels of the box blank adjacent the top edge as seen in Figure 12. The inward pull of the fingers 103 on the blank is represented by F in Figure 4 and is resisted by plunger surfaces 115 adjacent the fingers. The surfaces 115 exert the resisting force on the box blank which in Figure 4 is represented by the arrows 93.

The die D shown in Figure 9 comprises sweeps 116 and 117 for sweeping the front and back panels of the blank into upright position when the plunger forces the blank through the die.

The lateral elements of the die comprise, in addition to the aforementioned cam rails 114, projections 118 which engage the blank immediately adjacent the internal cuts 68, 69, 70 and 71. These projections urge the side panels of the blank towards the plunger against the action of the plunger projections 102 which exert a force on the internal tongues 72, 73, 74 and 75 in the opposite direction. Recesses 119 are provided adjacent the projections to permit the fingers 103 of the plunger to pass this portion of the die in fully projected position. Cam surfaces 120 guide the lock flaps of the box blank into their proper position under the outwardly flexed internal tongues 72, 73, 74, 75.

Figure 10:
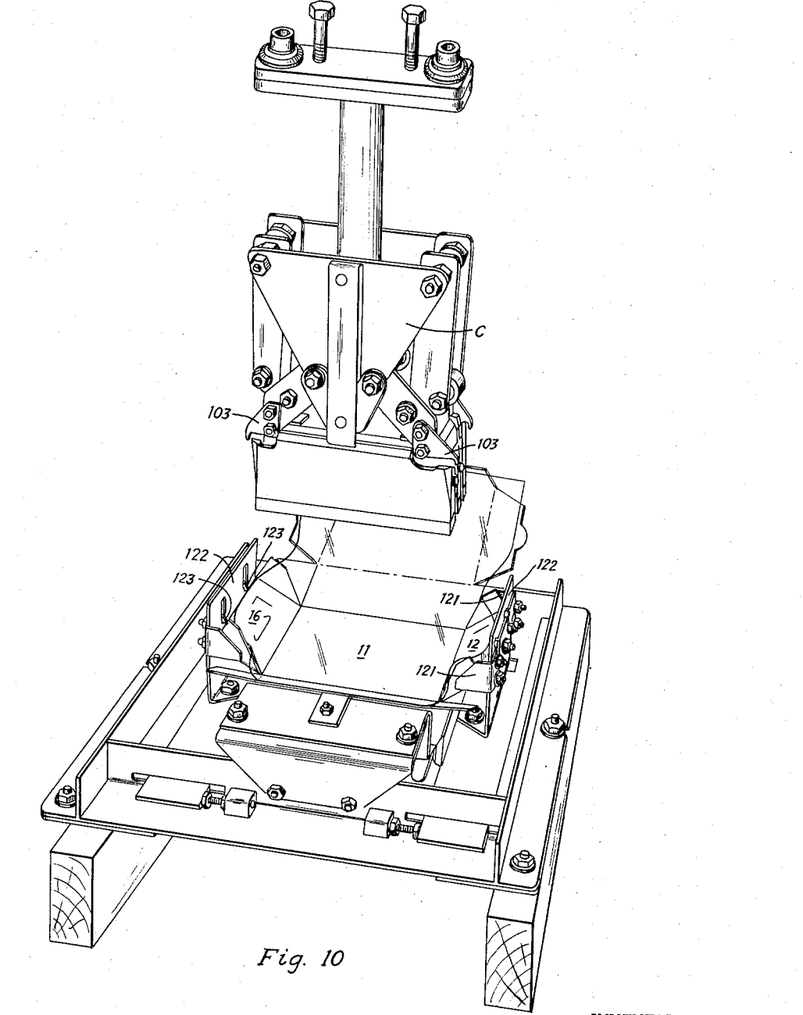
Fig. 10 is a perspective view of the die and plunger with a box blank at the stage of assembly shown in Fig. 2.

Figure 10 shows the die after partial insertion of a box blank and liner into it. The box blank is slightly prebroken at several crease lines, a preparatory operation performed by the suction feeder of the folding box machine. Mechanism for performing this operation is disclosed and claimed in the aforementioned patent to Baker and Lefief, 2,655,843. Basically such mechanism comprises a plurality of suction cups which carry the blank to the die and, instead of depositing it on the top of the die, press it slightly into the die, whereby the blank is engaged by corner sweeps 121 which fold the corner flaps 28, 29, 30 and 31 into substantially upright position with regard to the side panels 16 and 17. Also, the blank is forced between lateral sweeps 122 which are spaced slightly closer than the width of the blank and cause the side panels 16 and 17 to resume an angular position with regard to the bottom panel 11. When the suction feeder is retracted, catches 123 in the lateral sweeps 122 prevent the blank from slipping out of the die.

The plunger C then descends and forces the blank fully into and through the throat of the die. Figure 11 shows the blank in the position in which the gusset folds of the liner are being formed. At this stage the lock flaps are about to enter underneath the projected internal tongues 72, 73, 74, 75, which are not visible in the drawing. The fingers 103 of the plunger are still in fully projected position since the roller 108 has not yet struck the corresponding cam rail 114. In this position the fingers 103 lie above the top edge of the side panels of the blank which have sufficient clearance to swing up against the side surfaces 101 of the plunger without touching the fingers 103.

As the plunger moves deeper into the die, the front and back panels are fully erected, the lock flaps are inserted under the internal tongues as shown in Figure 4 at 73, and the external locking cuts are brought into the position in which their interior portions register. This position is shown in Figure 4 and was previously described.

At about this point the rollers 108 strike the cam rails 114 and cause the fingers 103 to be retracted. The fingers engage the side panel structure of the box blank at about the point identified by the arrow F and cause that portion of the blank to be pulled to the inside of the box to engage the safety catch of the lock as was described in connection with Figure 5. The accompanying flexing or twisting of the board causes the interior portions of the cuts, as represented by 64, to engage in edge-to-edge position.

The plunger continues its downward movement until the top edge of the box body is engaged by strippers 124 which snap inwardly after passage of the box blank and strip the finished box off the plunger as the plunger is being retracted out of the die. The assembled box has the appearance as shown in Figure 6 and is ready for filling. The filled box is then closed and appears as shown in Figure 7.

Figure 13:
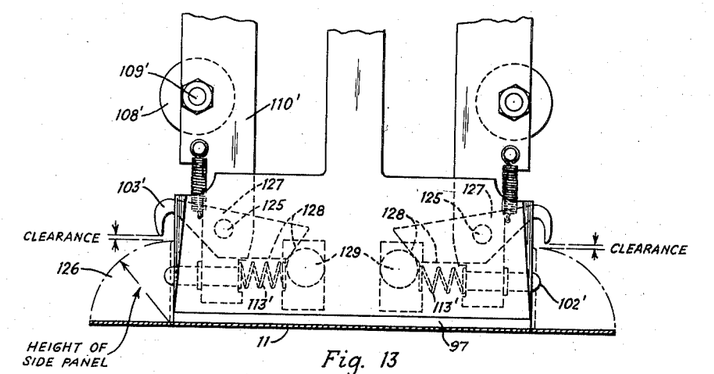
Fig. 13 is a partially diagrammatic side view of a modified plunger construction, the elements of the plunger being shown in rest position.
Figure 14:
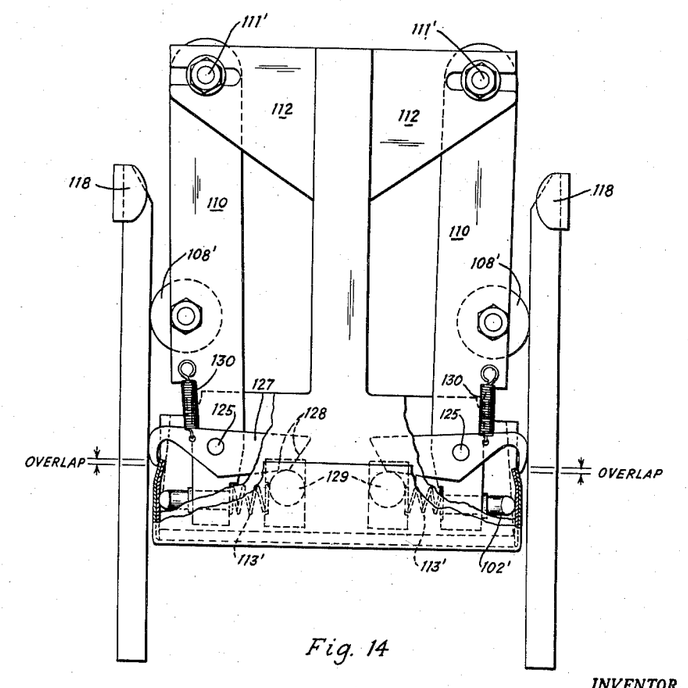
Fig. 14 illustrates the mechanism of Fig. 13 in the position which the elements assume in the die.

A plunger of modified construction is shown in Figures 13 and 14. The plunger comprises movable fingers 103' pivotally mounted on arms 110' at 125. The arms are pivotally supported at 111' in the side plate 112 of the plunger and are normally maintained in projected position by a spring 113'. The arms 110' also carry the projections 102' which normally project beyond the side surface 101 of the plunger. The tip of the fingers 103' normally clears the top edge of the side panel by a safe amount as indicated in Figure 13 by the arc 126 indicating the path of the top edge of a side panel, as the side panel is being folded into upright position with respect to the bottom panel 11.

The finger 103' is a part of a double armed lever 127 having cam surfaces 128. These cam surfaces rest against a transverse bar or cam 129 in the plunger.

When the plunger enters the die and its actuating roller 108' strikes the cam rail 114, the arms 110' swing towards the inside of the plunger thereby retracting the projections 102 which by this time have performed their function of opening the cuts in the side panels. At the same time, the lower cam surface 128 is caused to ride up on the transverse bar 129 thereby imparting a rotative motion to the double armed lever 127 and a downward and inward motion to the fingers 103'. As indicated in Figure 14 the angular movement of the lever 127 about its axis 125 against the action of a biasing spring 130 is sufficient to provide a safe overlap over the side panel of the box to perform the hereinbefore described locking operation.

The retractability of the projections 102' facilitates the subsequent removal of the assembled box from the plunger.

After retraction of the plunger from the die the arms 110' return to the position shown in Figure 13 and the double armed levers 127 which carry the fingers 103' perform a clockwise motion under the action of the spring 130 to prepare the plunger for the next blank.

What is claimed is:

1. A device for converting flat cut and scored box blanks, particularly lined blanks having side panels of a predetermined height, into hollow box form, the device comprising, a reciprocable plunger, and a die through which said plunger is movable, said plunger comprising a blank-engaging bottom surface and two opposite side surfaces substantially upright with respect to said bottom surface against which side surfaces the side panels of the blank are folded during passage of the plunger through the die, the plunger further comprising a projectable and retractable finger, said finger being mounted on said plunger for movement in a substantially vertical plane with respect to said bottom surface and substantially normal with respect to a side surface of the plunger, said finger pointing towards said bottom and being at a distance from the bottom more than said height except the tip of the finger which is at a distance less than said height so as to clear, in projected position, the side panel structure of the box and to engage the outside surface of the side panel structure adjacent its top edge when being retracted, said plunger including a fixed element adjacent said finger, between said finger and the closest corner of the plunger, said fixed element having a blank-side-panel supporting surface portion, said finger tip being movable past said element into a position below said surface portion when retracted; and means controlled by the stroke of the plunger for moving said finger.

2. A device for converting flat cut and scored box blanks, particularly lined blanks having side panels of a predetermined height, into hollow box form, the device comprising, a reciprocable plunger, and a die through which said plunger is movable, said plunger comprising a blank-engaging bottom surface and two opposite side surfaces substantially upright with respect to said bottom surface against which side surfaces the side panels of the blank are folded during passage of the plunger through the die, the plunger further comprising a scissors-type mechanism comprising a movable finger and a fixed element past which said finger moves as one blade of scissors moves past the other, said movable finger being mounted on said plunger for movement in a substantially vertical plane with respect to said bottom surface and substantially normal with respect to the surface of a side of the plunger, said finger depending towards said bottom surface and terminating at a distance from said bottom surface sufficient to extend beyond the top edge of the side wall structure of a blank on said plunger, said fixed element having a surface portion substantially in the same plane as said side surface to engage and support the inner surface of an overlying box side panel structure, said fixed element being spaced from the path of said finger to permit flexing, without tearing, of the finger engaged portion of the side panel structure past the adjacent fixed-element-supported portion of the side panel structure; and means controlled by the stroke of the plunger for moving said finger.

3. A device for converting flat cut and scored box blanks, particularly lined blanks having side panels of a predetermined height, into hollow box form, the device comprising, a reciprocable plunger, and a die through which said plunger is movable, said plunger comprising a blank-engaging bottom surface and two opposite side surfaces substantially upright with respect to said bottom surface against which side surfaces the side panels of the blank are folded during passage of the plunger through the die, the plunger further comprising two pairs of projectable and retractable fingers, arms for swingable supporting said fingers on said plunger for movement in a substantially vertical plane with respect to said bottom surface and substantially normal to the side surfaces of the plunger, said fingers pointing towards the bottom and being spaced from the bottom sufficiently to clear the top edge of a side panel structure of said height when the fingers are projected but close enough to the bottom for the fingers to engage the outside surface of the said panel structure adjacent its top edge when being retracted, said plunger including a fixed element adjacent each said finger between the respective finger and the adjacent plunger corner, said fixed element having a blank-side-panel supporting surface portion, said finger being movable past said element into a position below said surface portion, when retracted, said die having recessed portions opposite said fingers for clearance of said fingers during passage of the plunger through the die with projected fingers; means for biasing said fingers towards their projected position; a cam surface on said die; and a cam follower on said plunger for retracting said arms when said plunger passes through the die.

4. A plunger for forming flat box blanks into hollow box form, the plunger comprising a body having a box blank engaging bottom wall and side walls substantially upright with respect to said bottom wall against which side walls the side panel structures of the blank are foldable, said side wall having a recess in it, a finger projecting from said recess, said finger being substantially flat and extending in a plane substantially normal to said bottom wall and said side walls, said finger having a substantially lateral portion and a depending tip portion depending from said lateral portion in the direction towards the bottom wall, the location of the finger with respect to a box blank workable by said plunger being such that said lateral finger portion extends above, and clears the top edge of a side panel structure overlying the recessed wall, the tip portion of the finger depending over the outside of the said side panel portion sufficiently far to engage the outside of the panel structure adjacent its top edge if the finger is retracted towards said recess; means for supporting said finger for movement into, and out of said recess; means for biasing said finger towards its projected position; and means for retracting said finger into said recess, the length of the stroke of the finger from retracted to fully projected position and the extent of the overhang of the tip portion being so related to the height of the wall panel of a blank workable by said finger, that the arc with a radius equal to said panel height, such arc being described about a center defined by the edge of the plunger at which said side wall and said bottom wall meet, clears the tip of the extended finger, but does not clear it when the finger is retracted into the plane of the said side wall, said recessed side wall including a fixed surface element between said finger and the closest corner of the plunger, said element being spaced from the path of said finger by a distance sufficient to permit flexing, without tearing, of the finger engaged portion of the side panel structure past the adjacent element-supported portion of the side panel structure.

5. A device as defined in claim 4 in which the means for mounting the finger comprise a lever supporting the finger at one end, said lever being mounted on the plunger about a pivotal axis substantially parallel to the bottom wall of the plunger and lying closer to the plunger axis than the side wall from which the finger projects, whereby the finger moves on an arc approaching the plunger axis and the plunger bottom when being retracted.

6. A box blank folding plunger for use in conjunction with a die, the plunger comprising a substantially box-shaped body having a blank engaging bottom surface and side walls substantially upright with respect to the bottom surface against which side walls the side panels of the blank are folded during passage of the plunger through the die, the plunger further comprising a support movable towards and away from a plunger wall; a projection mounted on said support, said projection extending through an aperture in the plunger wall; a finger pivotally mounted on said support, the tip of the finger pointing towards said bottom surface and being projectable from and retractable towards said side wall by movement of said support, said finger including a cam surface; a fixed counter element in said plunger body, said element engaging said cam surface and being so arranged with respect to the cam surface as to produce a movement of the tip of the finger towards said bottom when the said finger and said projection are being retracted; and means responsive to the stroke of the plunger for moving said support.

7. A box blank folding plunger for use in conjunction with a die, the plunger comprising a substantially box-shaped body having a blank engaging bottom surface and side walls substantially upright with respect to the bottom surface against which side walls the side panels of the blank are folded during passage of the plunger through the die, the plunger further comprising a pendulously supported arm; a projection mounted on said arm, said projection extending through an aperture in the plunger wall; a double armed lever pivotally mounted on said arm at a greater distance from said bottom surface than said projection, said lever comprising, at one end, a finger shaped portion pointing towards said bottom surface and being projectable from and retractable towards said side wall by pendulous movement of said arm, the said lever comprising at the opposite end a cam surface; a fixed counter element in said plunger body, said element engaging said cam surface and being so arranged as to pivot said lever in a direction to move the finger portion towards the bottom surface when the finger is being retracted; means responsive to the stroke of the plunger for pendulously moving said arm in one direction; and a spring for moving the arm in the opposite direction.

8. A device for converting flat cut and scored box blanks, particularly lined blanks having side panels of a predetermined height, into hollow box form, the device comprising, a reciprocable plunger, and a die through which said die is movable, said plunger comprising a blank-engaging bottom surface and side walls substantially upright with respect to said bottom surface against which side walls the side panels of the blank are folded during passage of the plunger through the die, the plunger further comprising a projection on at least one side wall projecting beyond the remainder of the side wall, said projection having a certain distance above said bottom surface; a finger pointing towards said bottom and being at a greater distance above said bottom surface than said projection; movable supporting means for said projection and said finger for jointly projecting and retracting said projection and finger with respect to the plunger side wall; means for reducing the distance of said fingers from said bottom surface during retraction of the finger; and means controlled by the stroke of the plunger for actuating said supporting means.

9. The method of assembling, without the use of extraneous means, such as staples or adhesive, in rigid corner forming relationship the corner portion of an internally lined box blank, the box blank proper including a bottom panel, two wall panels articulated to the bottom panel along bottom fold lines forming an angle with each other, a lock flap articulated to one of said wall panels along a corner fold line and a corner flap articulated to the other wall panel along a flap fold line underlying the corner fold line in the set-up corner, the liner overlying said box blank and more particularly said wall panels, said bottom panel and said flaps and being adhesively secured to said bottom panel, said wall panels and said corner flap, the method comprising severing the other panel by an internal cut of bent outline to form an internal tongue in said other panel extending towards the corner in the assembled blank, the tongue being resiliently deflectable with respect to the remainder of the other panel; cutting said other panel by an external cut extending into the body of the panel from its top edge, said external cut having an interior portion remote from the respective top edge and an exterior portion adjacent the top edge, said two portions extending at an angle to each other; cutting said lock flap by an external cut extending into the body of the lock flap from its top edge, said last named external cut also having an interior position remote from the respective top edge and an exterior position adjacent the top edge, the interior portions of both cuts being in substantial coincidence to permit engagement when the corner is set up, the exterior portion of the wall cut being at a greater distance from the corner fold line than the exterior portion of the lock flap cut, the exterior portion of at least one of the external cuts being at an angle to the interior portion of the same cut whereby a hook is formed by the angled cut adjacent the respective top edge; pressing on the portion of said liner which overlies said tongue to deflect said tongue relatively to the remainder of said other panel thereby forming a wedge-shaped slit in said other wall panel; folding said wall panels towards an upright position with respect to said main panel and folding said flaps with respect to the wall panels to which they are articulated to move the corner flap into a position overlying the inside surface of the one panel, the liner forming a gusset about the corner flap, and to move the lock flap into a position overlying the outside surface of the other wall panel and under said deflected tongue until said internal cut portions are in register; and then pressing on the lock flap adjacent its top edge on the far side of the external cut with respect to the corner fold line, such pressure being directed to the inside of the box, and simultaneously pressing on the portion of said liner which overlies the inside of said other wall panel adjacent its top edge on the near side of the external cut with respect to the flap fold line, said last named pressure being directed to the outside of the box, to displace by such pressures the portion of the lock flap adjacent its external cut portion to the inside of said other wall panel, thereby forming a safety catch maintaining the interior portions of the cuts in locking register.

10. The method of assembling, without the use of extraneous means, such as staples or adhesive, in rigid corner forming relationship the corner portion of an internally lined box blank, the box blank proper including a bottom panel, two wall panels articulated to the bottom panel along bottom fold lines forming an angle with each other, a lock flap articulated to one of said wall panels along a corner fold line and a corner flap articulated to the other wall panel along a flap fold line underlying the corner fold line in the set-up corner, the liner overlying said box blank and more particularly said wall panels, said bottom panel and said flaps and being adhesively secured to said bottom panel, said wall panels and said corner flap, the method comprising, severing the other panel by an internal cut of bent outline to form an internal tongue in said other panel extending towards the corner in the assembled blank, the tongue being resiliently deflectable with respect to the remainder of the other panel; cutting said other panel by an external cut extending into the body of the panel from its top edge, said external cut having an interior portion remote from the respective top edge and an exterior portion adjacent the top edge, said two portions extending at an angle to each other; cutting said lock flap by an external cut extending into the body of the lock flap from its top edge, said last named external cut also having an interior portion remote from the respective top edge and an exterior portion adjacent the top edge, the interior portions of both cuts being in substantial coincidence to permit engagement when the corner is set up, the exterior portion of the wall cut being at a greater distance from the corner fold line than the exterior portion of the lock flap cut, the exterior portion of the lock flap cut being in angular relationship to the interior portion of the lock flap cut thereby forming a hook on the lock flap pointing towards the corner fold line; pressing on the portions of said liner which overlies said tongue to deflect said tongue relatively to the remainder of said other panel thereby forming a wedge-shaped slit in said other panel; folding said wall panels towards an upright position with respect to said main panel and folding said flaps with respect to the wall panels to which they are articulated to move the corner flap into a position overlying the inside surface of the one panel, the liner forming a gusset about the corner flap, and to move the lock flap into a position overlying the outside surface of the other wall panel and under said deflected tongue until said internal cut portions are in register; and then pressing on the lock flap adjacent its top edge on the far side of the external cut with respect to the corner fold line such pressure being directed to the inside of the box and simultaneously pressing on the portion of said liner which overlies the inside of said other wall panel adjacent its top edge on the near side of the external cut with respect to the flap fold line, said last named pressure being directed to the outside of the box, to displace by such pressures the hook on the lock flap to the inside of said other wall panel, whereby the hook becomes a safety catch maintaining the interior portions of the cuts in locking register.

References Cited in the file of this patent

UNITED STATES PATENTS

| | | |
|---|---|---|
| 1,365,920 | Joslin | Jan. 18, 1921 |
| 1,835,401 | Joslin | Dec. 8, 1931 |
| 2,580,189 | Pagendarm | Dec. 25, 1951 |
| 2,714,344 | Baker | Aug. 2, 1955 |